United States Patent [19]
Chiesi et al.

[11] Patent Number: 6,116,449
[45] Date of Patent: Sep. 12, 2000

[54] STRIP OF CONTAINERS FOR LIQUIDS OR PASTES

[75] Inventors: Paolo Chiesi; Luigi Tagliapietra; Marco Del Corno; Ross De Salvo, all of Parma, Italy

[73] Assignee: Chiesi Farmaceutici S.p.A., Parma, Italy

[21] Appl. No.: 09/147,474

[22] PCT Filed: Jul. 3, 1997

[86] PCT No.: PCT/EP97/03496

§ 371 Date: Feb. 22, 1999

§ 102(e) Date: Feb. 22, 1999

[87] PCT Pub. No.: WO98/01348

PCT Pub. Date: Jan. 15, 1998

[30] Foreign Application Priority Data

Jul. 5, 1996 [IT] Italy .................................. 96A001385

[51] Int. Cl.[7] ....................................................... B65D 1/02
[52] U.S. Cl. ......................... 220/23.4; 206/526; 206/820; 206/538
[58] Field of Search ................................... 206/526, 484, 206/820, 823, 538, 539; 222/94, 105, 456, 541.6, 541.9; 215/6; 220/23.4

[56] References Cited

U.S. PATENT DOCUMENTS

| | | | |
|---|---|---|---|
| 3,221,939 | 12/1965 | Brown | 222/94 |
| 4,469,254 | 9/1984 | Hansen | 222/456 |
| 4,512,475 | 4/1985 | Federighi | 206/484 |

FOREIGN PATENT DOCUMENTS

| | | |
|---|---|---|
| 0326529 | 8/1989 | European Pat. Off. . |
| 642928 | 5/1984 | Switzerland . |

*Primary Examiner*—Jim Foster
*Attorney, Agent, or Firm*—Oblon, Spivak, McClelland, Maier & Neustadt, P.C.

[57] ABSTRACT

A strip of containers for liquids, pastes or powders. The containers may be used for pharmaceutical, diagnostic, cosmetic or similar uses. The series of containers are closed at one end and have a removable plug at the other end. The containers are joined together by breakable intermediate connection elements near their longitudinal center and by breakable terminal connection elements positioned in correspondence with the plugs. The intermediate and terminal breakable connection elements lie in different planes than the one which contains the longitudinal axis of the containers so that the structure of the container strip is stiffened.

22 Claims, 12 Drawing Sheets

STRIP OF CONTAINERS FOR LIQUIDS OR PASTES

CROSS REFERENCE TO RELATED APPLICATIONS

This application claims priority under 35 U.S.C. §119 to Italian patent application MI96A001385 filed Jul. 5, 1996, the entire contents of which is incorporated herein by reference.

BACKGROUND OF THE INVENTION

1. Field of the Invention

This invention concerns a strip of single dose or multiple dose containers for liquids, pastes or powders, for pharmaceutical, diagnostic, cosmetic or similar uses, made of plastic material by injection moulding and joined between themselves by removable couplings.

2. Discussion of the Background

Container strips of this type are well known and must be extensively adjusted before being placed on the market.

In particular, the containers of the strip are substantially tubular in shape, with one open end for the filling of the product. The moulded strips are placed in a hopper and transferred from there onto machines which supply the various functional groups which control, for example, the operations of transfer, filling, closing and welding of the containers, as well as packaging or alignment or boxing of bare strips or strips contained in packages and so on.

The individual containers of each strip are normally joined together by two series of fins or bridges: a series of fins set in an intermediate position along the containers and a series of fins set at level of the capped ends of the containers, provided with a plug obtained during moulding. The two series of fins are disposed in the plane containing the axes of the containers and are provided with weakening creases or pre-fracture lines which allow the separation of the individual containers during use. The containers are opened at the far end by twisting the plug.

The biggest problem which occurs with these strips of containers is that due to a lack of rigidity, they tend to get entangled, to overlap, to become deformed or to break, either during filling, positioning into the machine, or during the various manufacturing steps. To try to overcome these difficulties, EP-B-0 326 529 proposes a container strip in which:

- the intermediate and terminal junction fins which join the bodies of the individual containers have arrow shaped pre-fracture lines, or are at least, diverging with respect to the axes of the containers;
- the ends of the series of intermediate and terminal fins have transverse butts disposed at right angle to the plane occupied by the fins, aligned between themselves and having a width less, or at the most, equal to the thickness of the containers; the intermediate, transverse butts are connected on both sides to the respective end fins by one or more triangular ribs; the terminal fins are deeper to have a greater width and are provided with external ribs as wide as the transverse butts, tapered towards the area of the weakening creases;
- the free terminal section of the body of each container has an external cylindrical thickening.

This solution has been adopted particularly to reduce the possibility of entangling and overlapping of the strips.

However, the solution proposed in EP-326 529 does not completely solve these problems, as the strips of containers leaving the injection press while they are still hot, tend to bend and are consequently still subject to overlapping and entanglement during the successive operations.

SUMMARY OF THE INVENTION

The object of the invention is to eliminate these disadvantages in proposing a strip of containers which has sufficient rigidity to resist bending of the plane passing through the axes of the containers and consequently of overcoming the problems of entanglement and overlapping of the containers during the successive operations.

Another object of the invention is to provide a strip of containers of the type described above, which will allow the easy removal of the individual containers when required for use.

A further object of the invention is to provide a strip of containers which will be easy to injection mould with a consequent lowering of costs.

The main object of the invention is reached with the characteristics listed in the annexe, independent claim 1.

The other objects and advantageous applications of the invention appear in the dependent claims.

Substantially, the solution proposed by the invention to increase rigidity to the strip of containers, consists of placing the container connection elements and their pre-fracture points on at least two different planes, at least one of these planes not coinciding with the plane of the axes of the containers.

According to a first embodiment of the invention, the connecting elements set in correspondence with the ends of the containers provided with a plug, lie on a plane perpendicular to the plane containing the axes of the containers.

The connection elements placed in the middle zone of the containers can be inclined alternately with various degrees of inclination and preferably of +10 degrees and −10 degrees with respect to the plane occupied by the axes of the containers.

According to a second embodiment of the invention, both the connection elements positioned in the middle area and those positioned in the terminal area in correspondence with the plugs, are alternatively inclined with various degrees of inclination and preferably of +10 degrees and −10 degrees with respect to the plane occupied by the axes of the containers. In this case, the two elements of connection of adjoining containers can be in parallel planes or in incident planes forming a double angle with respect to the alternate staggering of the following connecting elements.

Conveniently, according to the invention, the connecting elements are joined together by means of only two junction points, thus facilitating their rupture.

According to the invention, the plug of each container can be positioned in the axis of the container itself as known in the art, or it can be rotated through 90 degrees with respect to the axis of the containers.

This latter solution offers the advantage of simpler removal of the plug when using the container and of easier moulding of the strip.

Different shaped buffers can be provided at the two sides of the strip.

BRIEF DESCRIPTION OF THE DRAWINGS

Further characteristics of the invention will become clearer from the detailed description which follows, referred to its purely exemplifying form and so not limiting in its execution and illustrated in the drawings of which:

FIGS. 1/A to 5/A are frontal views and sections according to the planes indicated in the corresponding perspective representations of FIGS. 1 to 5, before the filling of the containers;

BRIEF DESCRIPTION OF THE PREFERRED EMBODIMENTS

Equal or corresponding parts are shown in these Figures with the same reference numbers.

Figure 1:
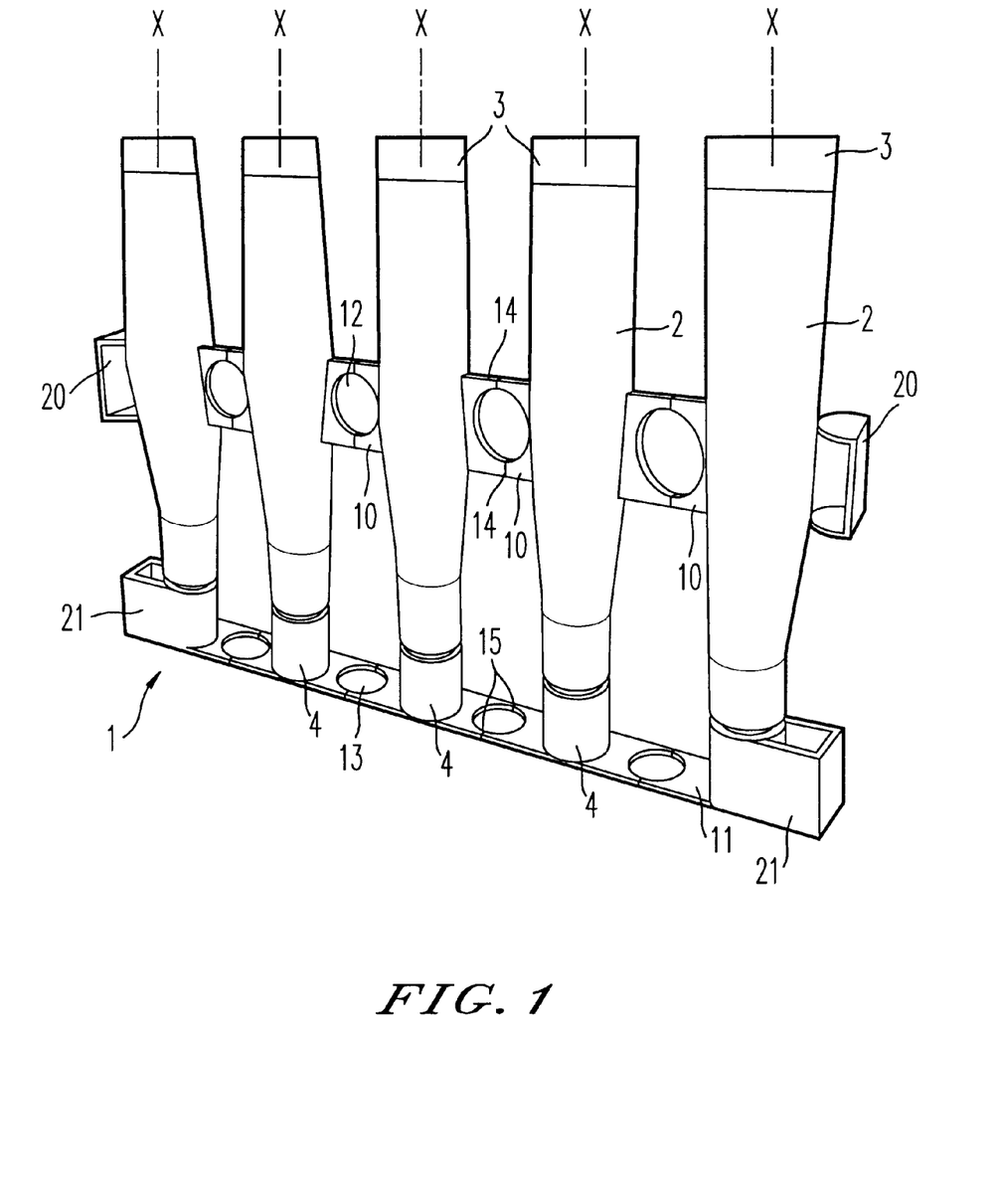
FIGS. 1 to 5 are perspective views which illustrates as many more or less different constructions of a strip of containers according to the invention.
Figure 1A:
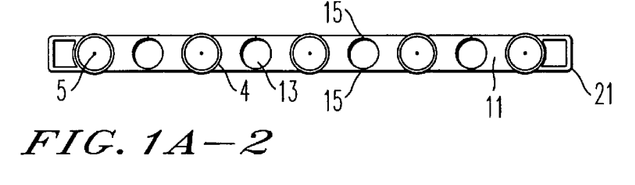
Figures 1A, 1A, 1A:
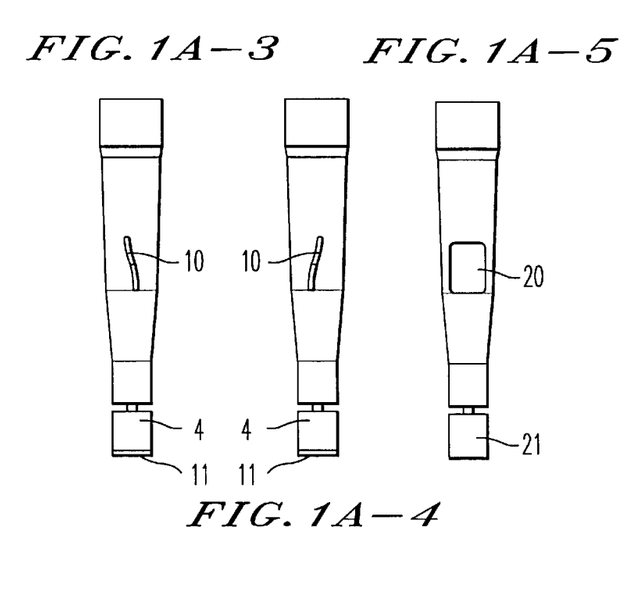
Figures 1A, 1A:
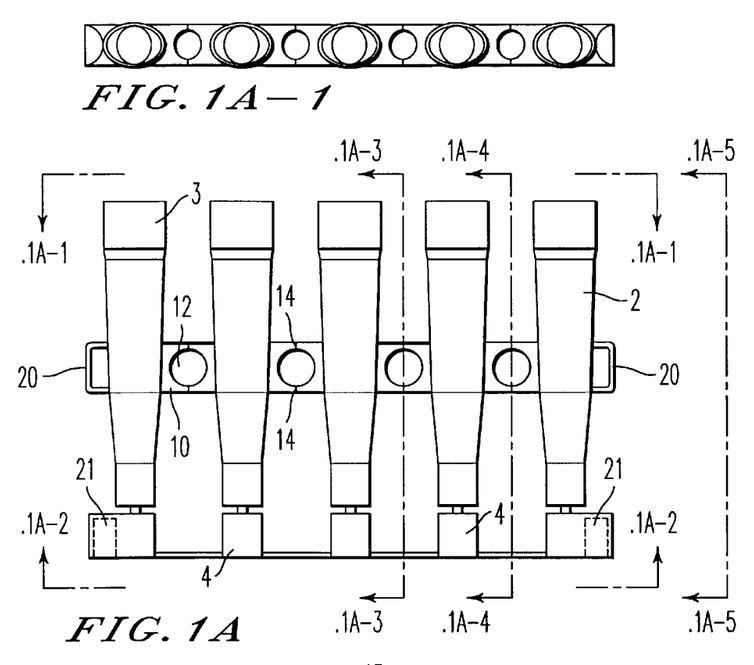

In FIGS. 1 and 1/A, 1 indicates a strip of containers according to the invention. The containers are shown in FIG. 1, already filled with the product which could be a liquid, a cream, a paste or a powder for pharmaceutical, diagnostic, cosmetic or similar use, and in FIG. 1/A before being filled. Therefore in FIG. 1 they have a transversal seal 3 at the top end, and a removable plug 4 at the opposite end, aligned with the x axis of the container. Before filling, the strip 1 of containers is maintained in an upright position as shown in the Figure, leaning on the plugs 4, with the containers 2 open at the top to receive the product, after which they are closed by pressing of the open end and then heat sealed, as shown in the Figure.

The containers 2 are joined together by means of intermediate connection elements 10, positioned approximately in the middle part of the containers, and by terminal connection elements 11, positioned in correspondence with the plugs 4.

According to the invention, to increase rigidity to the strip 1, according to the construction shown in FIGS. 1 and 1/A, the terminal connection elements 11 are positioned on a plane perpendicular to the plane containing the x axes of the containers 2, and substantially perpendicular to the plane of the intermediate connection elements 10.

To further increase the rigidity of the strip 1, the intermediate connection elements 10 in FIG. 1 are inclined alternately in one direction and in the other, for example +10 degrees and −10 degrees with respect to the plane occupied by the x axes of the containers.

The connection elements 10 and 11 shown in FIG. 1 are substantially in the form of rectangular fins, with a large internal hole 12, 13, so as to leave only two respective junction points 14, 15, sometimes further weakened to facilitate the separation of a container from the strip during use. The junction points 14, 15, are positioned in the centre line of the connection elements 10, 11, opposite to each other.

In this way, the separation of the containers 2 is facilitated as this takes place by twisting around the longitudinal axis of the strip 1, rather than by bending backwards and forwards along the axis of the connection elements (lying in the plane containing the x axes of the containers) as occurs in the known technology.

To keep the strips separate from each other during the different manufacturing operations, respective buffer elements 20 and 21 are provided on the two sides of each strip, respectively placed in correspondence with the intermediate section of the end containers of the strip and in correspondence with their plugs.

In particular, the middle buffers 20 are U-brackets shaped with the centre line in the plane of the containers, whereas the buffers 21 are conveniently placed integrally with the corresponding plugs 4 and also are U-brackets shaped, positioned perpendicularly to the middle buffers, that is with their middle plane parallel to the plane of the terminal connection elements 11.

Figure 2:
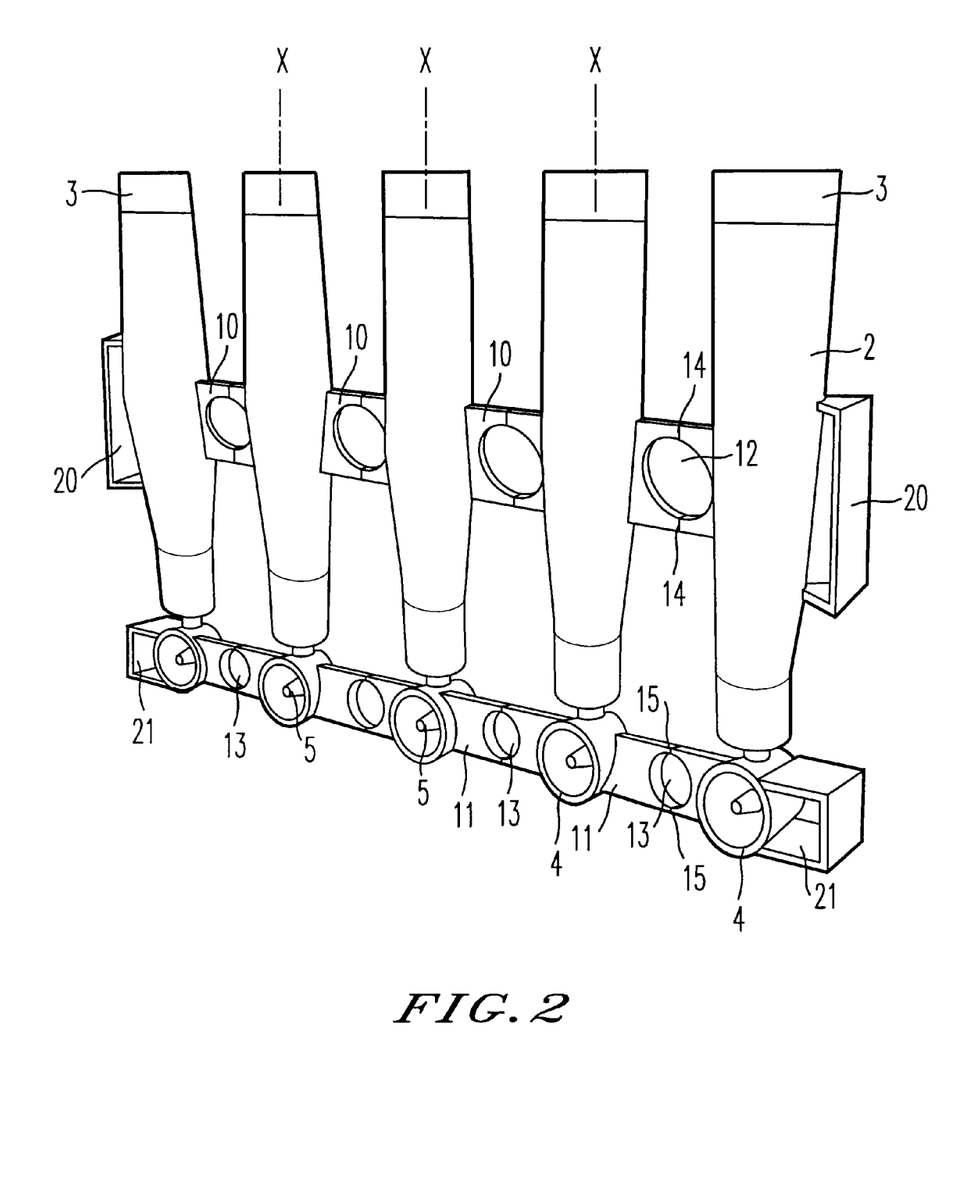
Figures 2A, 2A, 2A:
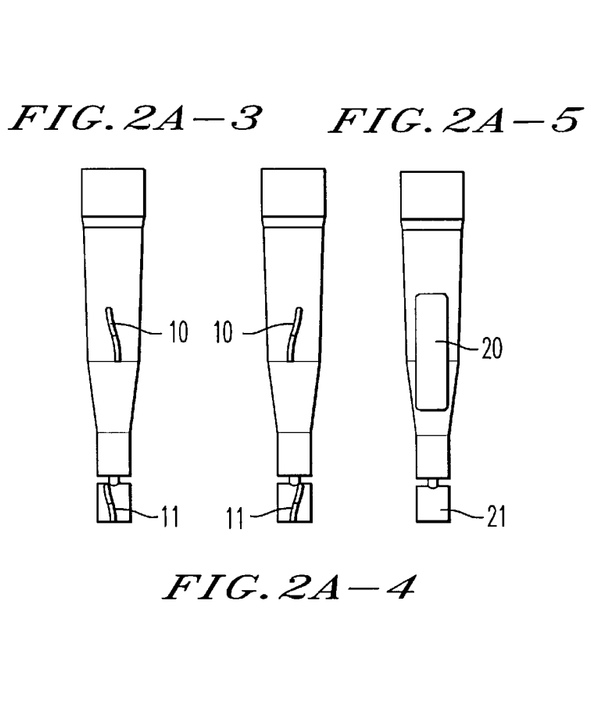

The design illustrated in FIGS. 2 and 2/A differs from that of FIGS. 1 and 1/A, by the fact that the plugs 4, the connection elements 11 and the buffers 21 are rotated through 90 degrees with respect to their positions in FIGS. 1 and 1/A and so have their axes perpendicular to the plane containing the x axes of the containers 2.

Figures 2A, 2A, 2A:
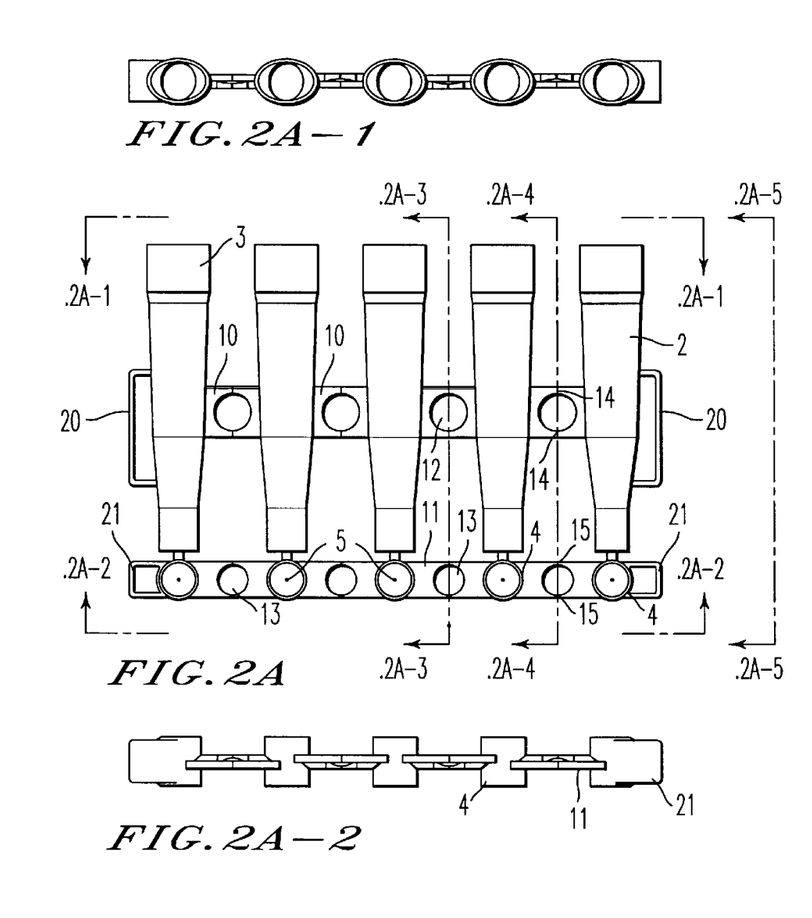

This solution allows easier removal of the plugs 4 from the body of the containers 2, and is easier to obtain by moulding, eliminating movement of the mould.

It can be seen from FIGS. 2 and 2/A that the plugs 4 have an internal peg 5 to close the small hole produced in the container 2 when the plug 4 is removed, to allow the reuse of the product in the container 2, when it is not monodose.

The connection elements 11 in FIGS. 2 and 2/A positioned in correspondence with the plugs 4, are inclined alternately with respect to the plane containing the x axes of the containers 2, forming the same angle of the middle connection elements 10. Therefore, the middle (10) and the terminal (11) connection elements which join two adjacent containers 2 lie in parallel planes.

Anyway, the invention includes a design in which there is a staggering between the inclinations of the connection elements 10 and 11.

In the design shown in FIGS. 2 and 2/A, the buffers 20 and 21 are aligned on the same plane, and the buffers 20 are bigger than the buffers of the design shown in FIGS. 1 and 1/A.

Figure 3:
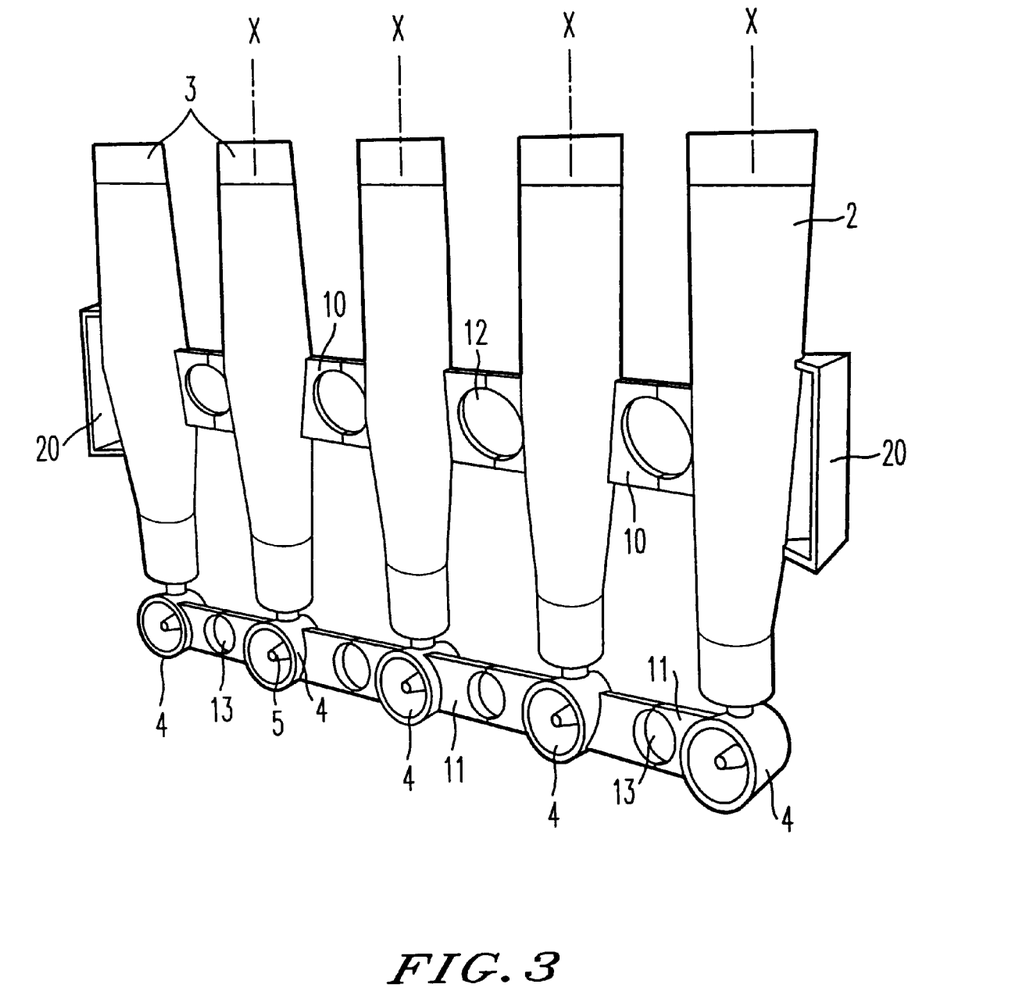
Figures 3A, 3A, 3A:
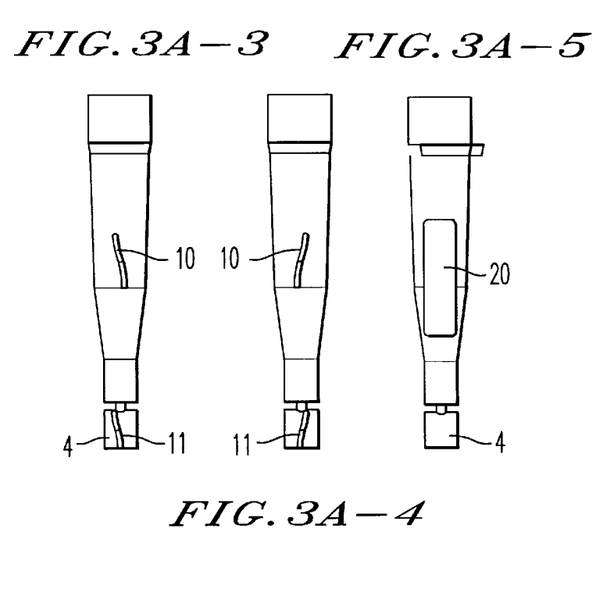
Figures 3A, 3A, 3A:
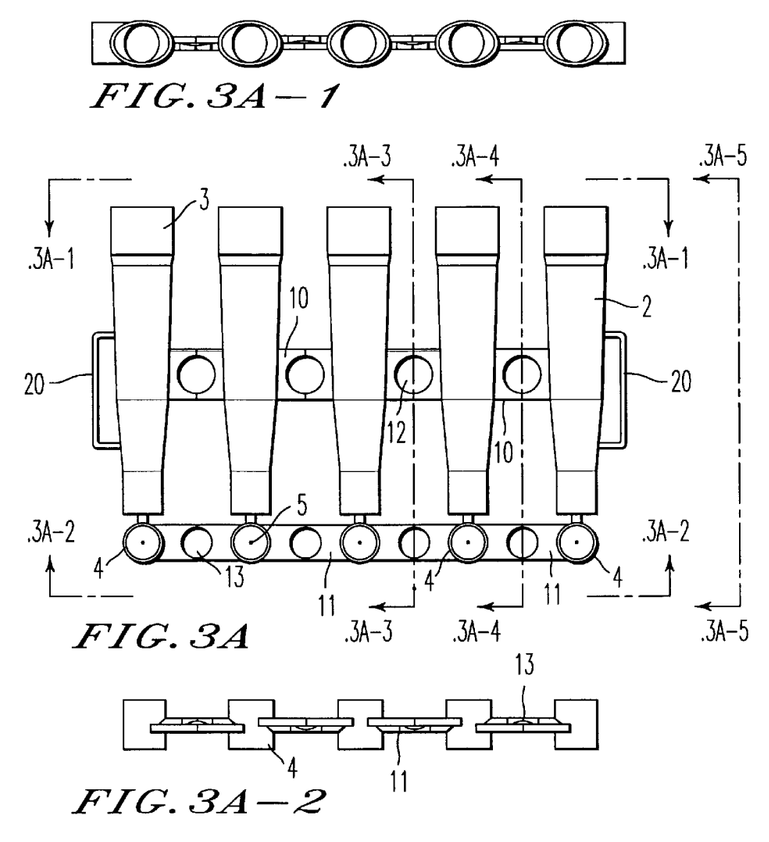

FIGS. 3 and 3/A show a design corresponding to that of FIGS. 2 and 2/A from which it differs only by the elimination of the buffers 21 in correspondence with the plugs and by the lengthening of the middle buffers 20.

Figure 4:
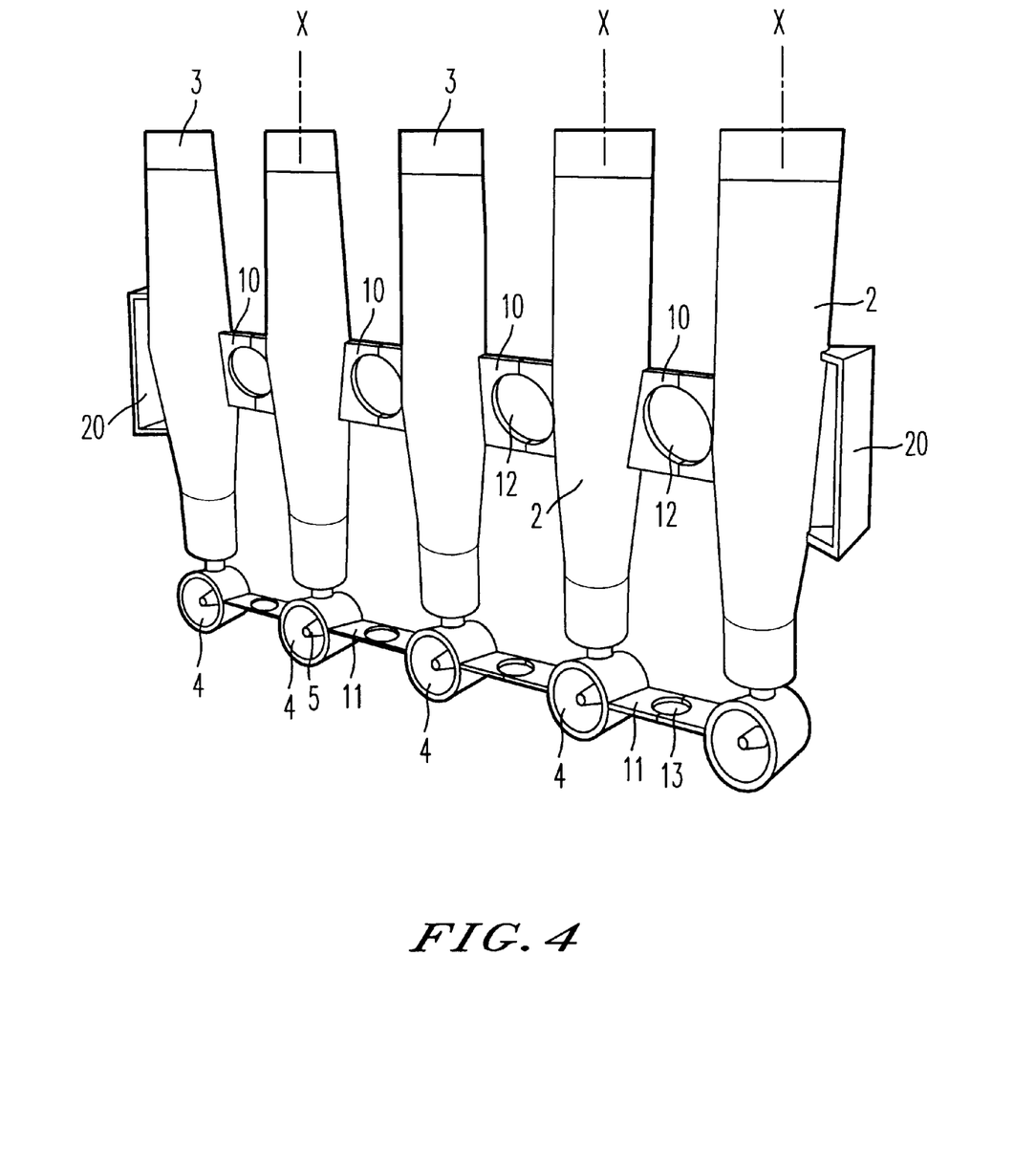
Figure 4A:
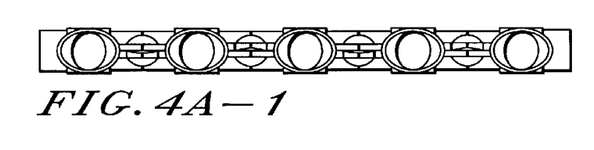

The design in FIGS. 4 and 4/A differs from that in FIGS. 3 and 3/A by having rotated the terminal connection elements 11, of 90 degrees, in positioning them substantially in a perpendicular plane to that of the x axes of the containers 2, as in the design shown in FIGS. 1 and 1/A, in maintaining however the axes of the plugs 4 perpendicular to the axes of the containers.

Figure 4A:
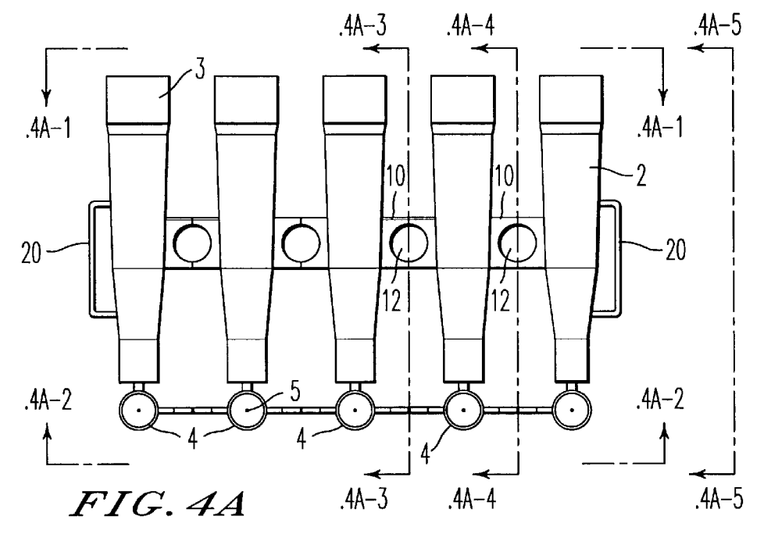
Figure 4A:
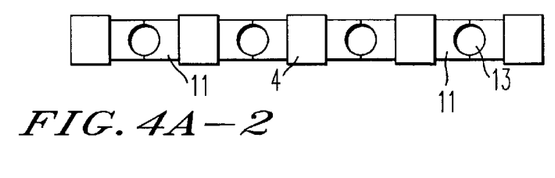
Figures 4A, 4A, 4A:
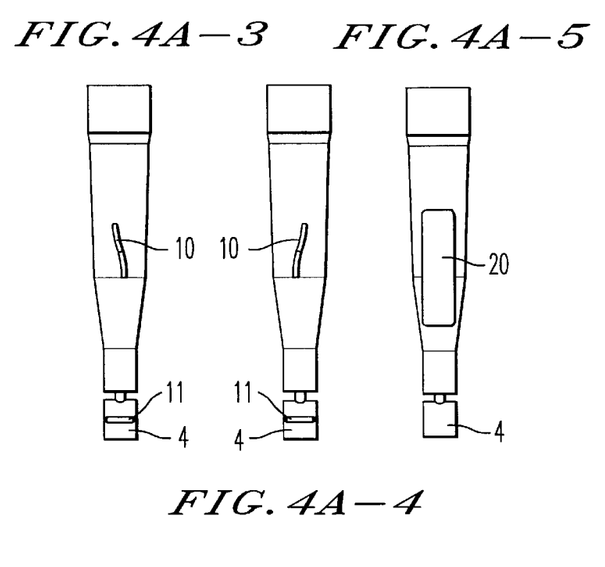

The connection elements 11 between the plugs 4 can lie on the same plane or be alternately inclined as the corresponding middle connection elements.

Figure 5:
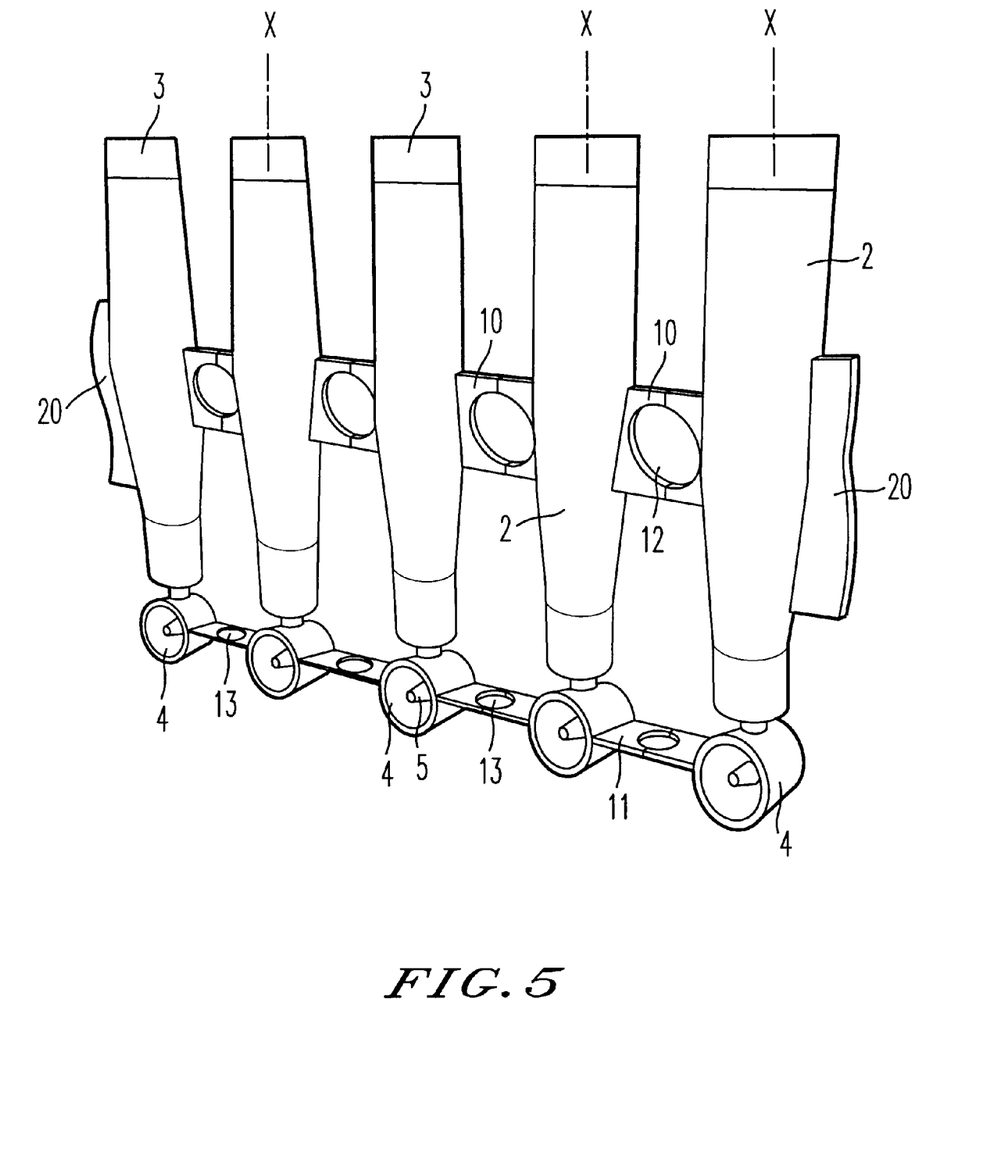
Figure 5A:
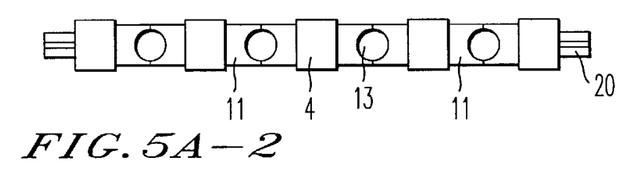
Figures 5A, 5A, 5A:
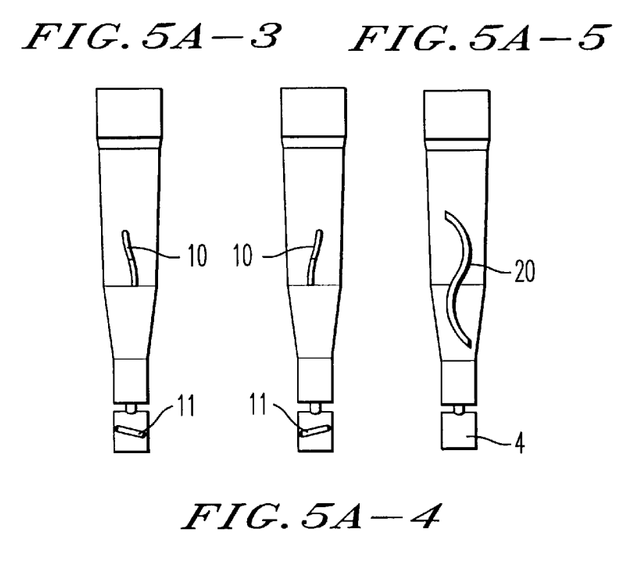

The design shown in FIGS. 5 and 5/A differs from that of FIGS. 4 and 4/A by the fact that the middle buffers 20, instead of being U bracket shaped, are sinusoidal or wave shaped, continuously attached to the body of the container 2.

Figures 5A, 5A:
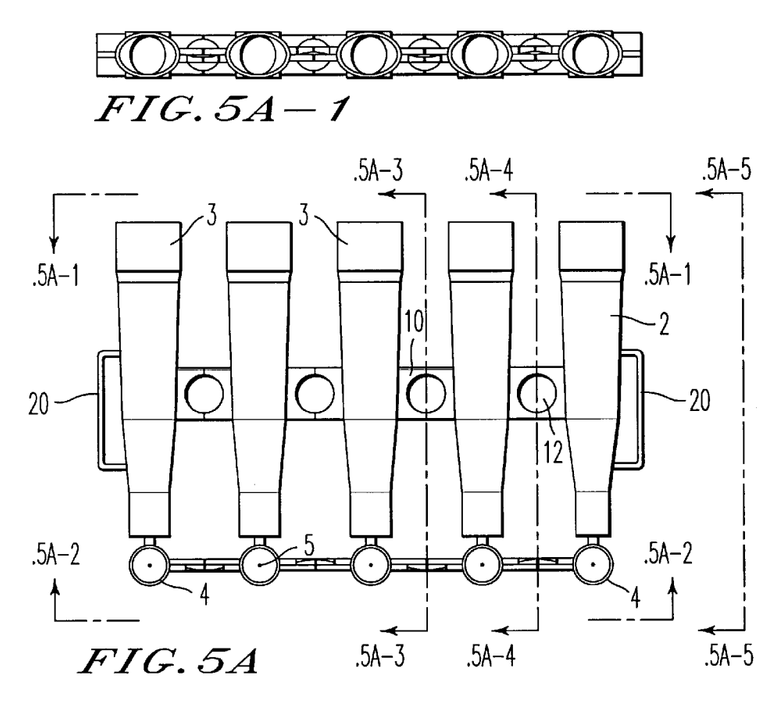
Figure 6:
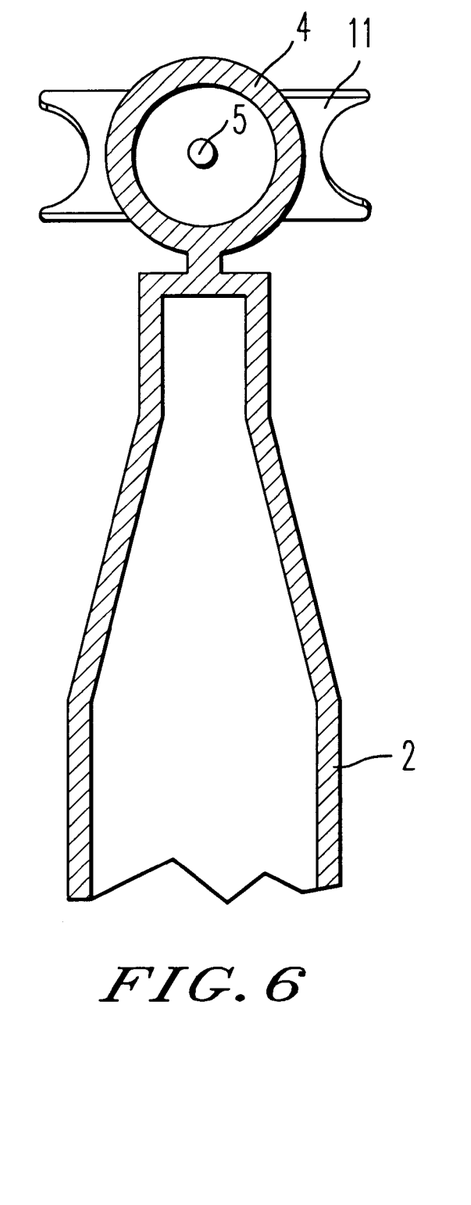
FIGS. 6 and 7 are partial views in section of a container of FIGS. 2, 2/A or 3, 3/A, with the plug, respectively in the starting position and during closing of the container.

The FIGS. 5 and 5/A show the alternation of inclination of the terminal connection elements 11.

Figure 7:
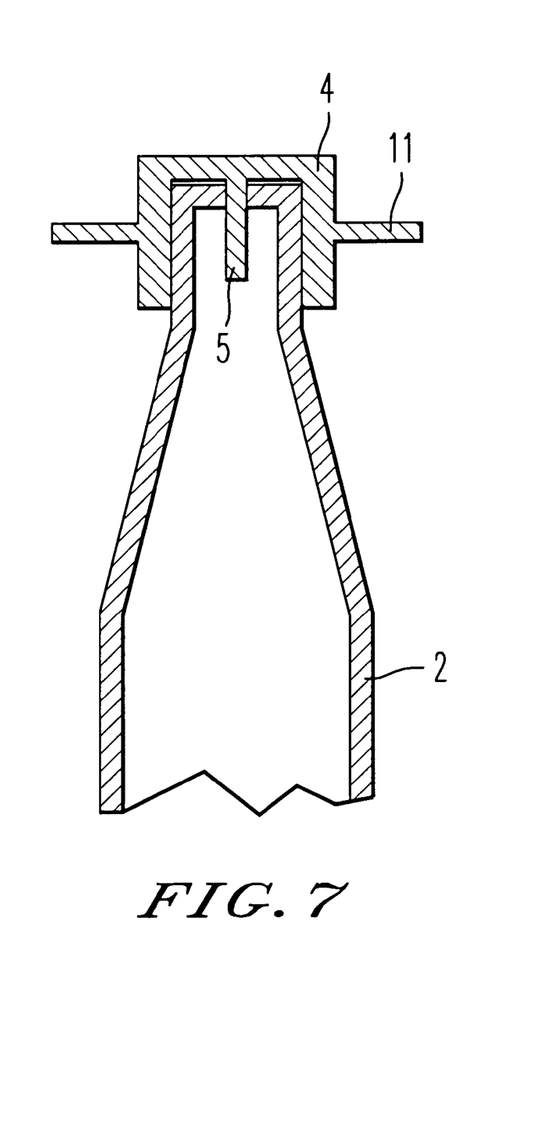
Figure 8:
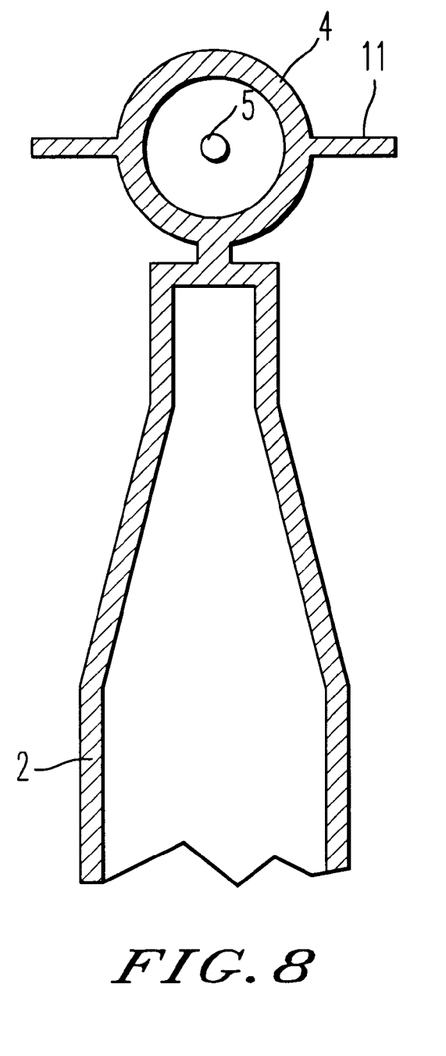
FIGS. 8 and 9 are the same views, with reference to a container according to the construction of FIGS. 5 and 5A.
Figure 9:
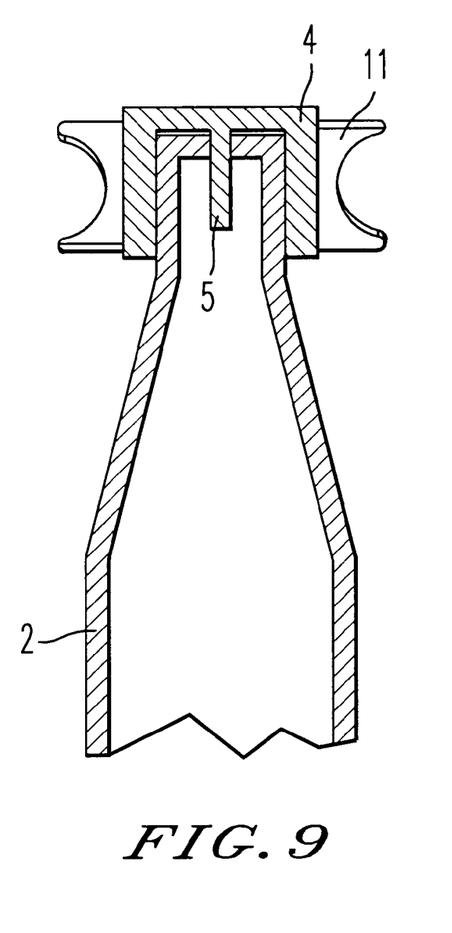

FIGS. 6, 7, 8, and 9 are particular views of the removable plug 4 respectively in its former fixed position (FIGS. 6 or 8) and in the position taken on after the removal from the container and insertion in the container aperture for its closing (FIGS. 7 and 9).

From the above description, the advantages of the invention which provides several stiffening axes as compared to solutions of the prior art, appear evident, in increasing the rigidity of the strip and eliminating risks of entanglement or overlapping during the passage through the various stations of a production line without compromising either the ease of removing containers 2 or the moulding of the elements.

Furthermore, the considerable size of the buffers 20 and 21 (when present) allows a greater bearing surface between the strips 1 in minimizing the risk of hooking or overlapping between them.

The transversal section of the containers 2 is elliptical to facilitate the terminal heat sealing 3, for a correct closing.

The container strip of the invention is conveniently made in plastic material and in heat sealable plastic material in particular.

Naturally, the invention is not limited to the form of design described above and shown in the attached figures, but includes whatever type of construction falling within the scope of the following claims.

What is claimed is:

1. Strip of containers for liquids, pastes, or powders for pharmaceutical, diagnostic, or cosmetic uses, including a series of containers closed at one end after filling and provided with a plug removable by breaking at the other end; the containers being joined together by breakable intermediate connection elements positioned in the middle part of the containers and breakable terminal connection elements positioned in correspondence with the above mentioned plugs, characterized in that said breakable connection elements lie along at least two different planes, at least one of which does not coincide with the plane containing the axes of the containers.

2. Strip of containers according to claim 1, wherein the intermediate connection elements lie on the plane containing the axes of the containers.

3. Strip of containers according to claim 2, wherein the intermediate connection elements are inclined part in one direction and part in the other, with respect to the plane containing the axes of the containers.

4. Strip of containers according to claim 3, wherein the intermediate connection elements are alternately inclined in one direction and in the other with respect to the plane containing the axes of the said containers.

5. Strip of containers according to claim 3, wherein the angle of inclination of the connection elements with respect to the plane containing the axes of the containers is about ±10 degrees.

6. Strip of containers according to claim 1, wherein the terminal connection elements lie on a plane perpendicular to the plane containing the axes of the said containers.

7. Strip of containers according to claim 1, wherein the terminal connection elements are inclined in one direction and the other with respect to the plane perpendicular to the plane containing the axes of the said containers.

8. Strip of containers according to claim 7, wherein the terminal connection elements are alternately inclined in one direction and in the other with respect to the plane perpendicular to the plane containing the axes of the said containers.

9. Strip of containers according to claim 1, wherein the terminal connection elements are inclined, in one direction and the other, with respect to the plane containing the axes of the said containers.

10. Strip of containers according to claim 9, wherein the terminal connection elements are alternately inclined in one direction and the other with respect to the plane containing the axes of the said containers.

11. Strip of containers according to claim 9, wherein the angle of inclination of the terminal connection elements with respect to the plane containing the axes of the said containers is about ±10 degrees.

12. Strip of containers according to claim 9, wherein the terminal connection elements are inclined in the same order as the intermediate connection elements.

13. Strip of containers according to claim 9, wherein the terminal connection elements are inclined in a staggered pattern with respect to the intermediate connection elements.

14. Strip of containers according to claim 1, wherein the removable plugs are positioned coaxially to the respective containers.

15. Strip of containers according to claim 1, wherein the removable plugs are positioned with their axes perpendicular to the axes of the respective containers.

16. Strip of containers according to claim 1, wherein the plugs have a central peg for the container to be reclosed.

17. Strip of containers according to claim 1, wherein the intermediate and terminal connection elements have central openings and are joined by means of pairs of jointing staples.

18. Strip of containers according to claim 17, wherein the pairs of jointing staples are positioned in the centre line of the connection elements, opposite to each other.

19. Strip of containers according to claim 1, wherein a buffer element, integral with the middle section of the body of the corresponding end container, is provided on the two extreme sides of the strip.

20. Strip of containers according to claim 19, wherein the buffer elements consist of U brackets whose central plane coincides with the plane containing the axes of the containers.

21. Strip of containers according to claim 19, wherein the buffer elements are sinusoidal or wave shaped.

22. Strip of containers according to from claim 19, wherein a further couple of buffer elements integral with the two end plugs of the series is provided.

* * * * *

UNITED STATES PATENT AND TRADEMARK OFFICE
CERTIFICATE OF CORRECTION

PATENT NO. : 6,116,449
DATED : September 12, 2000
INVENTOR(S) : Paolo Chiesi, et al.

It is certified that error appears in the above-identified patent and that said Letters Patent is hereby corrected as shown below:

<u>Title page,</u>
Item [30], the Foreign Application Priority Data is listed incorrectly. Item [30] should read as follows:

[30]     Foreign Application Priority Data
Jul. 5, 1996    [IT]    Italy .................................MI96A001385

Signed and Sealed this

Eighteenth Day of September, 2001

Attest:

NICHOLAS P. GODICI
Attesting Officer
Acting Director of the United States Patent and Trademark Office